US012769524B2

(12) United States Patent
Zmigrod et al.

(10) Patent No.: US 12,769,524 B2
(45) Date of Patent: Oct. 20, 2026

(54) SYSTEM AND METHOD TO EVALUATE CODE IMPORTANCE VIA GRAPH CENTRALITIES

(71) Applicant: JPMorgan Chase Bank, N.A., New York, NY (US)

(72) Inventors: Ran Zmigrod, Cambridge (GB); Salwa Husam Alamir, Bournemouth (GB); Sameena Shah, Scarsdale, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 605 days.

(21) Appl. No.: 18/211,961

(22) Filed: Jun. 20, 2023

(65) Prior Publication Data

US 2024/0427577 A1 Dec. 26, 2024

(51) Int. Cl.
*G06F 8/41* (2018.01)

(52) U.S. Cl.
CPC .................................... *G06F 8/433* (2013.01)

(58) Field of Classification Search
CPC ....................................................... G06F 8/433
See application file for complete search history.

(56) References Cited

U.S. PATENT DOCUMENTS 11,526,429 B1 * 12/2022 Dutta .................. G06F 11/3676
2011/0246635 A1 * 10/2011 Phukan .................. G06Q 10/10 709/223
2013/0145347 A1 * 6/2013 Karr .......................... G06F 8/75 717/113
2014/0123108 A1 * 5/2014 Cheluvaraju ....... G06F 11/3604 717/123
2020/0225935 A1 * 7/2020 Avgustinov ......... G06F 11/3624
2020/0285452 A1 * 9/2020 Azuma ................... G06F 8/433
2022/0291921 A1 * 9/2022 Balasubramanian ..... G06F 8/10

OTHER PUBLICATIONS

Hu, Yutao, et al. "TreeCen: Building tree graph for scalable semantic code clone detection." Proceedings of the 37th IEEE/ACM International Conference on Automated Software Engineering. 2022. (Year: 2022).*
Ying, Long, and De-wu Ding. "Topology structure and centrality in a java source code." 2012 IEEE International Conference on Granular Computing. IEEE, 2012. (Year: 2012).*

* cited by examiner

*Primary Examiner* — Joanne G Macasiano
(74) *Attorney, Agent, or Firm* — GREENBLUM & BERNSTEIN, P.L.C.

(57) ABSTRACT

Various methods and processes, apparatuses/systems, and media for systemically and dynamically evaluating code importance via graph centralities are disclosed. A processor splits a code base into a configurable level of granularity each defining as a component of the code base. Each component includes its associated dependencies. The processor converts the code base along with the components into a code graph representing a dependency structure of the code base. A node in the code graph represents a component in the code base and an edge in the code graph is a directed relationship between two components. The processor computes a variety of metrics for each node in the code graph including node metrics related to the code graph properties and centrality measures for assigning scores to nodes in accordance with corresponding measure of intricacies of the dependency structure and implements a scoring mechanism which associates an importance score for each node.

9 Claims, 6 Drawing Sheets

600

200

300

400

500

600

SYSTEM AND METHOD TO EVALUATE CODE IMPORTANCE VIA GRAPH CENTRALITIES

TECHNICAL FIELD

This disclosure generally relates to code base, and, more particularly, to methods and apparatuses for implementing a platform, language, cloud, and database agnostic code importance evaluating module configured to evaluate code importance via graph centralities.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Large code bases tend to have very entangled code with multi and cyclical dependencies existing throughout the code base. When a developer wishes to make a code change for their respective application, it is unknown whether the code they are changing is being used and may consequently break another component of the code base. Code importance may be used to help identify which parts of the code may be heavily relied on.

However, understanding the intricacies of large code bases may prove to be a challenging problem. A code base may have core underlying components and other components which may build on it. Such a hierarchy forms a natural sense of code importance, where if a piece of code with many dependencies break, many other applications in the code base may consequently break as well. Unfortunately, understanding the code hierarchy in large code bases may prove to be a challenging task, and moreover, there is rarely a straightforward hierarchy. Instead, as mentioned earlier, different components often depend on each other and cause cyclic dependencies.

Code importance plays a vital role in the software development pipeline in large scale organizations. Identifying which parts of the code are important may help in preventing possibly system-breaking bugs. By identifying which areas of the code are important, one may identify parts of code that should be given more importance for code updates/commits. For example, a bug in a function that is used by almost every application in the code base would cause a mass outage and so placing additional checks on any changes to this function (such as extra tests, pull request reviews, etc.) is important.

Thus, there is a need for an advanced method and tools that can address these conventional shortcomings corresponding to understanding the intricacies of large code bases.

SUMMARY

The present disclosure, through one or more of its various aspects, embodiments, and/or specific features or sub-components, provides, among other features, various systems, servers, devices, methods, media, programs, and platforms for implementing a platform, language, cloud, and database agnostic code importance evaluating module configured to systemically and dynamically evaluate code importance via graph centralities, but the disclosure is not limited thereto.

According to exemplary embodiments, the platform, language, cloud, and database agnostic code importance evaluating module may be configured to implement a graph theoretic approach and model the code base as a directed graph where code components (functions, files, libraries, etc.) are nodes, and code dependencies are edges in the graph. The code importance evaluating module then utilizes a combination of graph properties (e.g., number of neighbors) and graph centrality measures (e.g., betweenness centrality) to determine code importance properties of components, but the disclosure is not limited thereto.

According to exemplary embodiments, the graph approach implemented by the code importance evaluating module allows flexibility as there are a variety of different metrics and centralities a user can focus on to tailor the definition of code importance to different use cases. Because the graphs implemented by the code importance evaluating module are efficient in structures, a user can reason about large code bases efficiently.

According to exemplary embodiments, a method for evaluating code importance via graph centralities by utilizing one or more processors along with allocated memory is disclosed. The method may include: receiving a code base; splitting the code base into a configurable level of granularity each defining as a component of the code base wherein each component includes its associated dependencies; converting the code base along with the components into a code graph representing a dependency structure of the code base, wherein a node in the code graph represents a component in the code base and an edge in the code graph is a directed or ordered relationship between two components; computing a variety of metrics for each node in the code graph including node metrics related to the code graph properties and centrality measures for assigning scores to nodes in accordance with corresponding measure of intricacies of the dependency structure; implementing a scoring mechanism which associates an importance score for each node; and utilizing the importance score to evaluate code importance based on corresponding centrality measure.

According to exemplary embodiments, in splitting the code base, the method may further include: defining each dependency as any other components which a specific component uses or imports.

According to exemplary embodiments, the method may further include: defining each dependency in a manner such that when components are files, then a first component depends on a second component when the file of the first component uses or imports the file of the second component.

According to exemplary embodiments, the method may further include: defining each dependency in a manner such that the first component depends on the second component, and at the same time, the second component depends on the first component.

According to exemplary embodiments, in converting the code base into a code graph, the method may further include: identifying different components of the code base; finding all component dependencies in the code base; and generating the code graph in a manner such that each component is a node in the graph and each dependency is a directed or ordered edge in the code graph.

According to exemplary embodiments, the node metrics related to the code graph properties may include one or more of the following: number of incoming edges, number of outgoing edges, number of reachable nodes that can be reached following outgoing edges, number of nodes one can start from and follow outgoing edges to reach a current node, but the disclosure is not limited thereto.

According to exemplary embodiments, the centrality measures may include one or more of the following: degree centrality which relates to the number of edges it has, closeness centrality which relates to the number of edges one need to take to reach other nodes in the code graph, betweenness centrality which relates to how many paths use a given node in order to detect an amount of influence a node has over a flow of information in the code graph, and PageRank centrality which relates to a measure of influence of a node focusing on edges in a path rather than the nodes, but the disclosure is not limited thereto.

According to exemplary embodiments, the method may further include: implementing an artificial intelligence/machine learning model to cluster similar components to determine different types of components to be marked as important; and generating the importance score by utilizing the artificial intelligence/machine learning model.

According to exemplary embodiments, a system for evaluating code importance via graph centralities is disclosed. The system may include: a processor; and a memory operatively connected to the processor via a communication interface, the memory storing computer readable instructions, when executed, may cause the processor to: receive a code base; split the code base into a configurable level of granularity each defining as a component of the code base wherein each component includes its associated dependencies; convert the code base along with the components into a code graph representing a dependency structure of the code base, wherein a node in the code graph represents a component in the code base and an edge in the code graph is a directed or ordered relationship between two components; compute a variety of metrics for each node in the code graph including node metrics related to the code graph properties and centrality measures for assigning scores to nodes in accordance with corresponding measure of intricacies of the dependency structure; implement a scoring mechanism which associates an importance score for each node; and utilize the importance score to evaluate code importance based on corresponding centrality measure.

According to exemplary embodiments, in splitting the code base, the processor may be further configured to: define each dependency as any other components which a specific component uses or imports.

According to exemplary embodiments, the processor may be further configured to: define each dependency in a manner such that when components are files, then a first component depends on a second component when the file of the first component uses or imports the file of the second component.

According to exemplary embodiments, the processor may be further configured to: define each dependency in a manner such that the first component depends on the second component, and at the same time, the second component depends on the first component.

According to exemplary embodiments, in converting the code base into a code graph, the processor may be further configured to: identify different components of the code base; find all component dependencies in the code base; and generate the code graph in a manner such that each component is a node in the graph and each dependency is a directed or ordered edge in the code graph.

According to exemplary embodiments, the processor may be further configured to: implement an artificial intelligence/machine learning model to cluster similar components to determine different types of components to be marked as important; and generate the importance score by utilizing the artificial intelligence/machine learning model.

According to exemplary embodiments, a non-transitory computer readable medium configured to store instructions for evaluating code importance via graph centralities is disclosed. The instructions, when executed, may cause a processor to perform the following: receiving a code base; splitting the code base into a configurable level of granularity each defining as a component of the code base wherein each component includes its associated dependencies; converting the code base along with the components into a code graph representing a dependency structure of the code base, wherein a node in the code graph represents a component in the code base and an edge in the code graph is a directed or ordered relationship between two components; computing a variety of metrics for each node in the code graph including node metrics related to the code graph properties and centrality measures for assigning scores to nodes in accordance with corresponding measure of intricacies of the dependency structure; implementing a scoring mechanism which associates an importance score for each node; and utilizing the importance score to evaluate code importance based on corresponding centrality measure.

According to exemplary embodiments, in splitting the code base, the instructions, when executed, may cause the processor to further perform the following: defining each dependency as any other components which a specific component uses or imports.

According to exemplary embodiments, the instructions, when executed, may cause the processor to further perform the following: defining each dependency in a manner such that when components are files, then a first component depends on a second component when the file of the first component uses or imports the file of the second component.

According to exemplary embodiments, the instructions, when executed, may cause the processor to further perform the following: defining each dependency in a manner such that the first component depends on the second component, and at the same time, the second component depends on the first component.

According to exemplary embodiments, in converting the code base into a code graph, the instructions, when executed, may cause the processor to further perform the following: identifying different components of the code base; finding all component dependencies in the code base; and generating the code graph in a manner such that each component is a node in the graph and each dependency is a directed or ordered edge in the code graph.

According to exemplary embodiments, the instructions, when executed, may cause the processor to further perform the following: implementing an artificial intelligence/machine learning model to cluster similar components to determine different types of components to be marked as important; and generating the importance score by utilizing the artificial intelligence/machine learning model.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
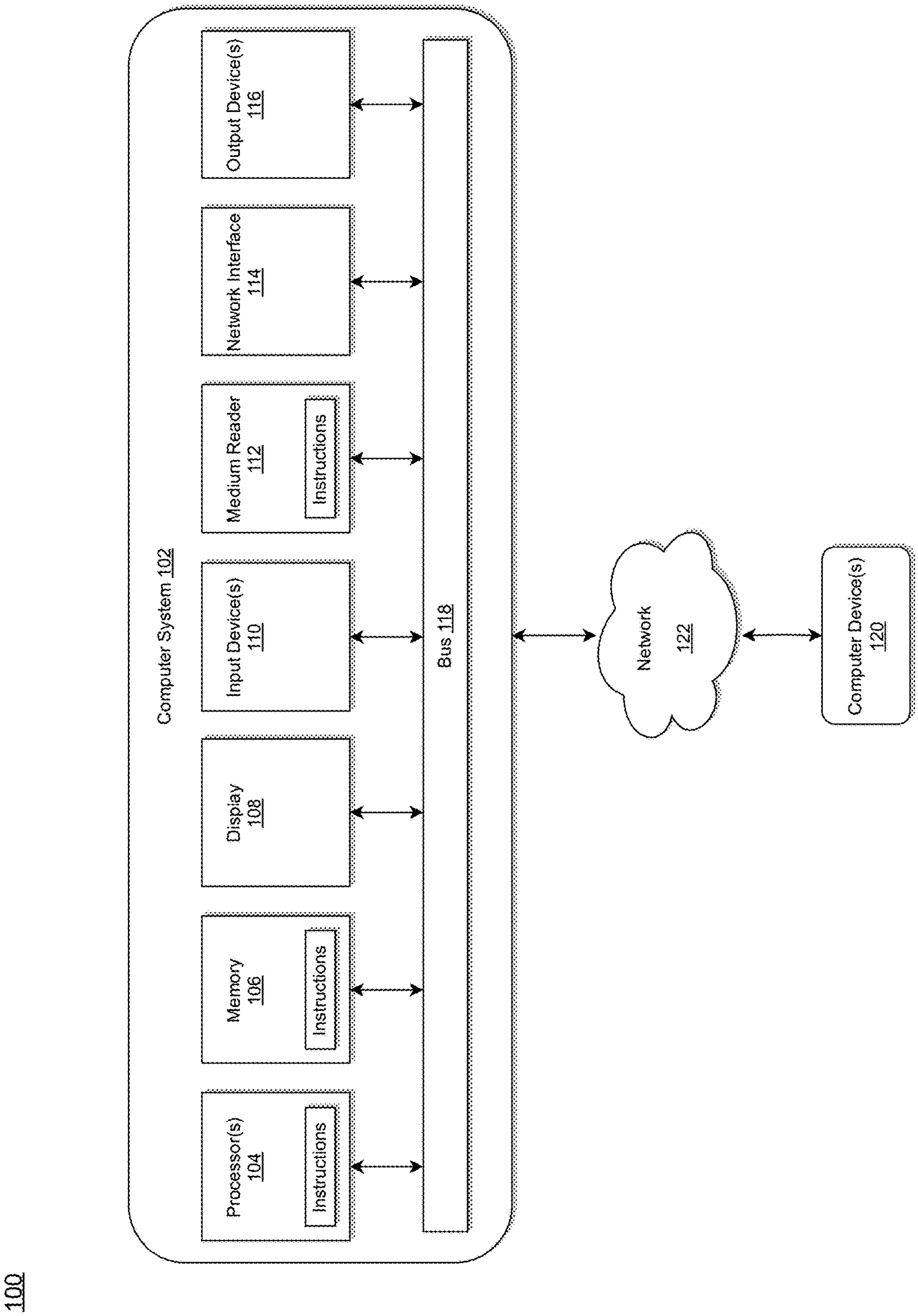
FIG. 1 illustrates a computer system for implementing a platform, language, database, and cloud agnostic code importance evaluating module configured to systemically and dynamically evaluate code importance via graph centralities in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform, language, database, and cloud agnostic code importance evaluating module configured to automatically and dynamically model large code bases as directed graphs and using graph metrics and graph centrality measures to identify important pieces of code in accordance with an exemplary embodiment. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the code importance evaluating module may be platform, language, database, and cloud agnostic that may allow for consistent easy orchestration and passing of data through various components to output a desired result regardless of platform, browser, language, database, and cloud environment. Since the disclosed process, according to exemplary embodiments, is platform, language, database, browser, and cloud agnostic, the code importance evaluating module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
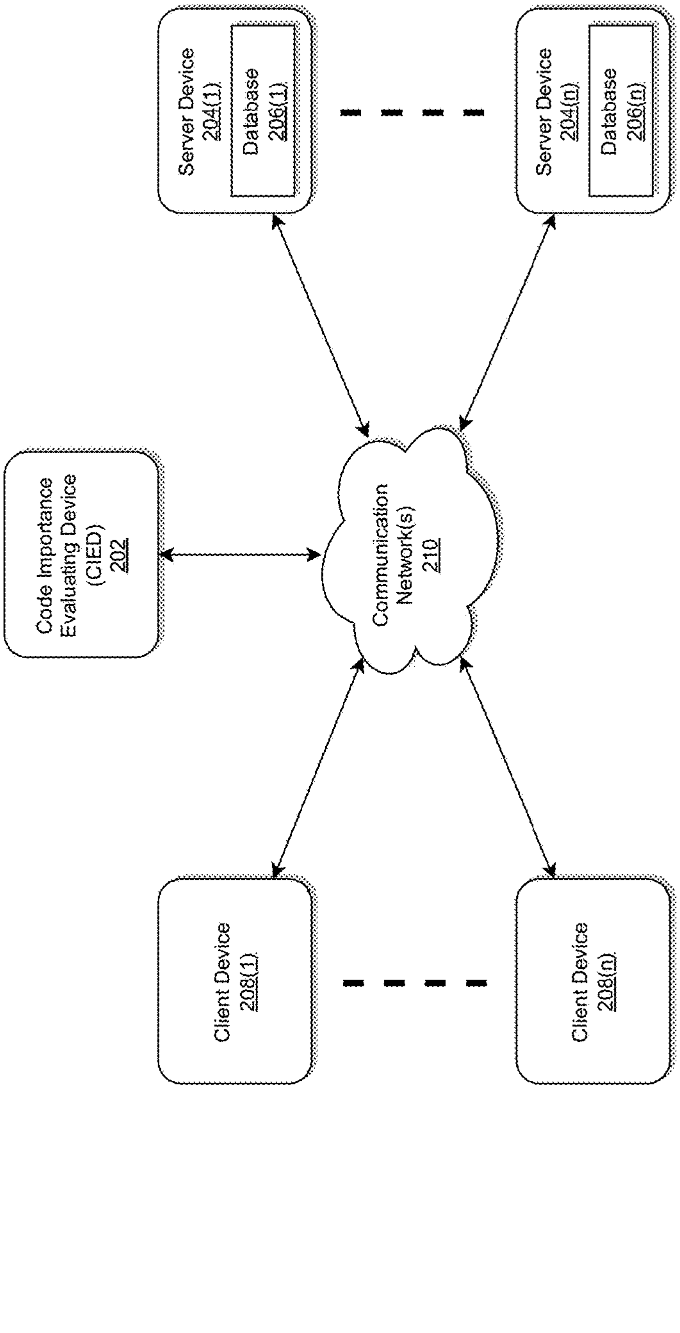
FIG. 2 illustrates an exemplary diagram of a network environment with a platform, language, database, and cloud agnostic code importance evaluating device in accordance with an exemplary embodiment.

Referring to FIG. 2, a schematic of an exemplary network environment 200 for implementing a language, platform, database, and cloud agnostic code importance evaluating device (CIED) of the instant disclosure is illustrated.

According to exemplary embodiments, the above-described problems associated with conventional tools may be overcome by implementing an CIED 202 as illustrated in FIG. 2 that may be configured for implementing a platform, language, database, and cloud agnostic code importance evaluating module configured to systemically and dynamically model large code bases as directed graphs and using graph metrics and graph centrality measures to identify important pieces of code, but the disclosure is not limited thereto.

The CIED 202 may have one or more computer system 102*s*, as described with respect to FIG. 1, which in aggregate provide the necessary functions.

The CIED 202 may store one or more applications that can include executable instructions that, when executed by the CIED 202, cause the CIED 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CIED 202 itself, may be located in virtual server(s) running in a cloud-based computing environment rather than being tied to one or more specific physical network computing devices. Also, the application(s) may be running in one or more virtual machines (VMs) executing on the CIED 202. Additionally, in one or more embodiments of this technology, virtual machine(s) running on the CIED 202 may be managed or supervised by a hypervisor.

In the network environment 200 of FIG. 2, the CIED 202 is coupled to a plurality of server devices 204(1)-204(*n*) that hosts a plurality of databases 206(1)-206(*n*), and also to a plurality of client devices 208(1)-208(*n*) via communication network(s) 210. A communication interface of the CIED 202, such as the network interface 114 of the computer system 102 of FIG. 1, operatively couples and communicates between the CIED 202, the server devices 204(1)-204(*n*), and/or the client devices 208(1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CIED 202, the server devices 204(1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CIED 202 may be a standalone device or integrated with one or more other devices or apparatuses, such as one or more of the server devices 204(1)-204(*n*), for example. In one particular example, the CIED 202 may be hosted by one of the server devices 204(1)-204(*n*), and other arrangements are also possible. Moreover, one or more of the devices of the CIED 202 may be in the same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. The server devices 204(1)-204(*n*) in this example may process requests received from the CIED 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206(*n*) that are configured to store metadata sets, data quality rules, and newly generated data.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(*n*) or other client devices 208(1)-208(*n*).

According to exemplary embodiments, the client devices 208(1)-208(*n*) in this example may include any type of computing device that can facilitate the implementation of the CIED 202 that may efficiently provide a platform for implementing a platform, language, database, and cloud agnostic code importance evaluating module configured to automatically and dynamically model large code bases as directed graphs and using graph metrics and graph centrality measures to identify important pieces of code, but the disclosure is not limited thereto.

The client devices 208(1)-208(*n*) may run interface applications, such as standard web browsers or standalone client applications, which may provide an interface to communicate with the CIED 202 via the communication network(s) 210 in order to communicate user requests. The client devices 208(1)-208(*n*) may further include, among other features, a display device, such as a display screen or touchscreen, and/or an input device, such as a keyboard, for example.

Although the exemplary network environment 200 with the CIED 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the CIED 202, the server devices 204(1)-204(*n*), or the client devices 208(1)-208(*n*), for example, may be configured to operate as virtual instances on the same physical machine. For example, one or more of the CIED 202, the server devices 204(1)-204(*n*), or the client devices 208(1)-208(*n*) may operate on the same physical device rather than as separate devices communicating through communication network(s) 210. Additionally, there may be more or fewer CIEDs 202, server devices 204(1)-204(*n*), or client devices 208(1)-208(*n*) than illustrated in FIG. 2. According to exemplary embodiments, the CIED 202 may be configured to send code at run-time to remote server devices 204(1)-204(*n*), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
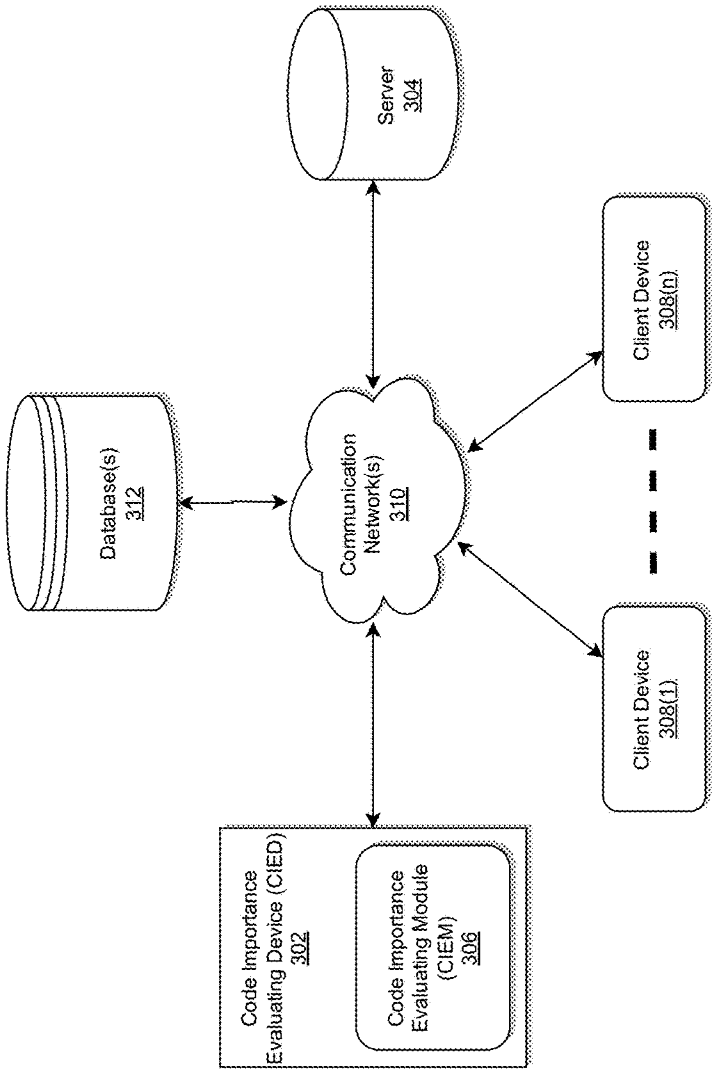
FIG. 3 illustrates a system diagram for implementing a platform, language, database, and cloud agnostic code importance evaluating device having a platform, language, database, and cloud agnostic code importance evaluating module in accordance with an exemplary embodiment.

FIG. 3 illustrates a system diagram for implementing a platform, language, and cloud agnostic CIED having a platform, language, database, and cloud agnostic code importance evaluating module (CIEM) in accordance with an exemplary embodiment.

As illustrated in FIG. 3, the system 300 may include an CIED 302 within which an CIEM 306 is embedded, a server 304, a database(s) 312, a plurality of client devices 308(1) . . . 308(*n*), and a communication network 310.

According to exemplary embodiments, the CIED 302 including the CIEM 306 may be connected to the server 304, and the database(s) 312 via the communication network 310. The CIED 302 may also be connected to the plurality of client devices 308(1) . . . 308(*n*) via the communication network 310, but the disclosure is not limited thereto.

According to exemplary embodiment, the CIED 302 is described and shown in FIG. 3 as including the CIEM 306, although it may include other rules, policies, modules, databases, or applications, for example. According to exemplary embodiments, the database(s) 312 may be configured to store ready to use modules written for each Application Programming Interface (API) for all environments. Although only one database is illustrated in FIG. 3, the disclosure is not limited thereto. Any number of desired databases may be utilized for use in the disclosed invention herein. The database(s) 312 may be a mainframe database, a log database that may produce programming for searching, monitoring, and analyzing machine-generated data via a web interface, etc., but the disclosure is not limited thereto. In addition, the database(s) 312 may store the large code bases models as directed graphs and graph metrics and graph centrality measures.

According to exemplary embodiments, the CIEM 306 may be configured to receive real-time feed of data from the plurality of client devices 308(1) . . . 308(*n*) and secondary sources via the communication network 310.

As may be described below, the CIEM 306 may be configured to: receive a code base; split the code base into a configurable level of granularity each defining as a component of the code base wherein each component includes its associated dependencies; convert the code base along with the components into a code graph representing a dependency structure of the code base, wherein a node in the code graph represents a component in the code base and an edge in the code graph is a directed or ordered relationship between two components; compute a variety of metrics for each node in the code graph including node metrics related to the code graph properties and centrality measures for assigning scores to nodes in accordance with corresponding measure of intricacies of the dependency structure; implement a scoring mechanism which associates an importance score for each node; and utilize the importance score to evaluate code importance based on corresponding centrality measure, but the disclosure is not limited thereto.

The plurality of client devices 308(1) . . . 308(*n*) are illustrated as being in communication with the CIED 302. In this regard, the plurality of client devices 308(1) . . . 308(*n*) may be "clients" (e.g., customers) of the CIED 302 and are described herein as such. Nevertheless, it is to be known and understood that the plurality of client devices 308(1) . . . 308(*n*) need not necessarily be "clients" of the CIED 302, or any entity described in association therewith herein. Any additional or alternative relationship may exist between either or both of the plurality of client devices 308(1) . . . 308(*n*) and the CIED 302, or no relationship may exist.

The first client device 308(1) may be, for example, a smart phone. Of course, the first client device 308(1) may be any additional device described herein. The second client device 308(*n*) may be, for example, a personal computer (PC). Of course, the second client device 308(*n*) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(*n*) may communicate with the CIED 302 via broadband or cellular communication. Of course, these embodiments are merely exemplary and are not limiting or exhaustive.

The computing device 301 may be the same or similar to any one of the client devices 208(1)-208(*n*) as described with respect to FIG. 2, including any features or combination of features described with respect thereto. The CIED 302 may be the same or similar to the CIED 202 as described with respect to FIG. 2, including any features or combination of features described with respect thereto.

Figure 4:
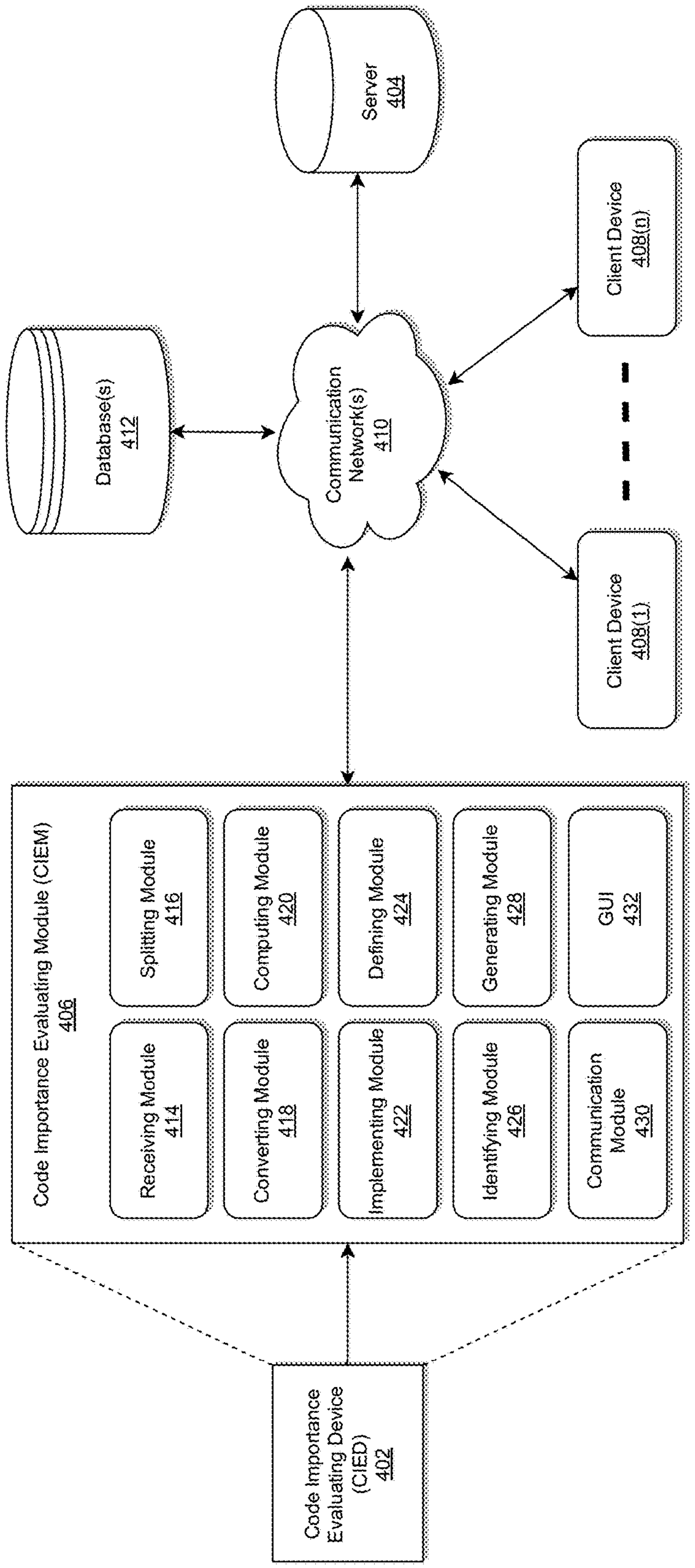
FIG. 4 illustrates a system diagram for implementing a platform, language, database, and cloud agnostic code importance evaluating module of FIG. 3 in accordance with an exemplary embodiment.

FIG. 4 illustrates a system diagram for implementing a platform, language, database, and cloud agnostic CIEM of FIG. 3 in accordance with an exemplary embodiment.

According to exemplary embodiments, the system 400 may include a platform, language, database, and cloud agnostic CIED 402 within which a platform, language, database, and cloud agnostic CIEM 406 is embedded, a server 404, database(s) 412, and a communication network 410. According to exemplary embodiments, server 404 may comprise a plurality of servers located centrally or located in different locations, but the disclosure is not limited thereto.

According to exemplary embodiments, the CIED 402 including the CIEM 406 may be connected to the server 404 and the database(s) 412 via the communication network 410. The CIED 402 may also be connected to the plurality of client devices 408(1)-408(*n*) via the communication network 410, but the disclosure is not limited thereto. The CIEM 406, the server 404, the plurality of client devices 408(1)-408(*n*), the database(s) 412, the communication network 410 as illustrated in FIG. 4 may be the same or similar to the CIEM 306, the server 304, the plurality of client devices 308(1)-308(*n*), the database(s) 312, the communication network 310, respectively, as illustrated in FIG. 3.

According to exemplary embodiments, as illustrated in FIG. 4, the CIEM 406 may include a receiving module 414, a splitting module 416, a converting module 418, a computing module 420, an implementing module 422, a defining module 424, an identifying module 426, a generating module 428, a communication module 430, and a GUI 432. According to exemplary embodiments, interactions and data exchange among these modules included in the CIEM 406 provide the advantageous effects of the disclosed invention. Functionalities of each module of FIG. 4 may be described in detail below with reference to FIGS. 4-6.

According to exemplary embodiments, each of the receiving module 414, splitting module 416, converting module 418, computing module 420, implementing module 422, defining module 424, identifying module 426, generating module 428, and the communication module 430 of the CIEM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the receiving module 414, splitting module 416, converting module 418, computing module 420, implementing module 422, defining module 424, identifying module 426, generating module 428, and the communication module 430 of the CIEM 406 of FIG. 4 may be implemented by microprocessors or similar, and may be programmed using software (e.g., microcode) to perform various functions discussed herein and may optionally be driven by firmware and/or software.

Alternatively, according to exemplary embodiments, each of the receiving module 414, splitting module 416, converting module 418, computing module 420, implementing module 422, defining module 424, identifying module 426, generating module 428, and the communication module 430 of the CIEM 406 of FIG. 4 may be implemented by dedicated hardware, or as a combination of dedicated hardware to perform some functions and a processor (e.g., one or more programmed microprocessors and associated circuitry) to perform other functions, but the disclosure is not limited thereto. For example, the CIEM 406 of FIG. 4 may also be implemented by Cloud based deployment.

According to exemplary embodiments, each of the receiving module 414, splitting module 416, converting module 418, computing module 420, implementing module 422, defining module 424, identifying module 426, generating module 428, and the communication module 430 of the CIEM 406 of FIG. 4 may be called via corresponding API, but the disclosure is not limited thereto. For example, calls may also be made using event based message interfaces in addition to APIs.

According to exemplary embodiments, the process implemented by the CIEM 406 may be executed via the communication module 430 and the communication network 410, which may comprise plural networks as described above. For example, in an exemplary embodiment, the various components of the CIEM 406 may communicate with the server 404, and the database(s) 412 via the communication module 430 and the communication network 410 and the results may be displayed onto the GUI 432. Of course, these embodiments are merely exemplary and are not limiting or exhaustive. The database(s) 412 may include the databases included within the private cloud and/or public cloud and the server 404 may include one or more servers within the private cloud and the public cloud.

Figure 5:
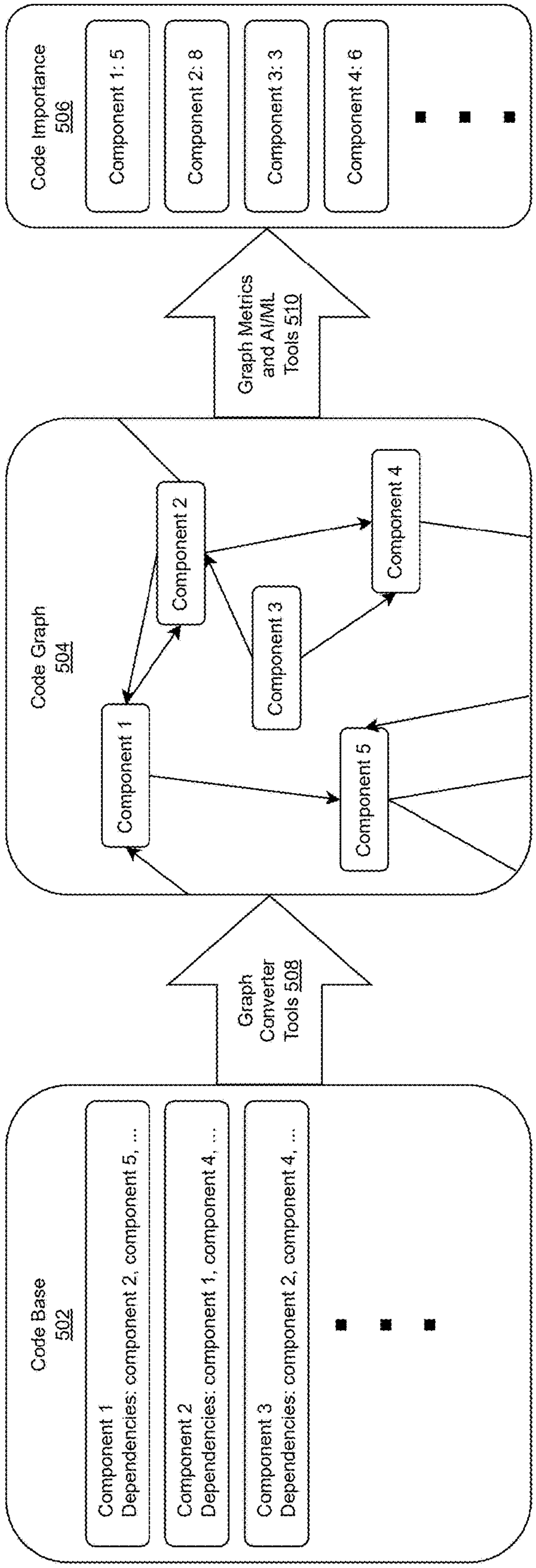
FIG. 5 illustrates an exemplary architecture diagram as implemented by the platform, language, database, and cloud agnostic code importance evaluating module of FIG. 4 for modelling large code bases as directed graphs and using graph metrics and graph centrality measures to identify important pieces of code in accordance with an exemplary embodiment.

FIG. 5 illustrates an exemplary architecture diagram 500 as implemented by the platform, language, database, and cloud agnostic CIEM 406 of FIG. 4 for modelling large code bases as directed graphs and using graph metrics and graph centrality measures to identify important pieces of code in accordance with an exemplary embodiment.

Referring back to FIGS. 4 and 5, according to exemplary embodiments, the receiving module 414 may be configured to receive a code base 502. The splitting module 416 may be configured to split the code base 502 into a configurable level of granularity each defining as a component of the code base 502 wherein each component includes its associated dependencies.

According to exemplary embodiments, the converting module 418 may be configured to convert the code base 502 along with the components into a code graph 504 representing a dependency structure of the code base 502. According to exemplary embodiments, a node in the code graph 504 may represent a component (i.e., component 1, component 2, component 3, . . . component n) in the code base 502 and an edge in the code graph 504 may be a directed or ordered relationship between two components. The converting module 418 may implement graph converter tools 508, but the disclosure is not limited thereto.

According to exemplary embodiment, the computing module 420 may be configured to compute a variety of metrics for each node in the code graph 504 including node metrics related to the code graph properties and centrality measures for assigning scores to nodes in accordance with corresponding measure of intricacies of the dependency structure. The implementing module 422 may be configured to implement a scoring mechanism which associates an importance score (i.e., component importance 506 as illustrated in FIG. 5) for each node; and utilize the importance score to evaluate code importance based on corresponding centrality measure. The component importance 506 having the importance score may be displayed onto the GUI 432. According to exemplary embodiments, in implementing the scoring mechanism, the implementing module 422 may implement graph metrics and artificial intelligence/machine learning tools 510 to calculate the component importance 506. As illustrated in FIG. 5, according to exemplary embodiments, the artificial intelligence/machine learning tools 510 may calculate importance score for component 1 to be 5, for component 2 to be 8, for component 3 to be 3, for component 4 to be 6 and so on, but the disclosure is not limited thereto. These values are simply utilized for illustration purposes without departing from the scope of the present disclosure.

According to exemplary embodiments, these scores can then be used for downstream purposes such as assessing code riskiness, bug likeliness, among others, but the disclosure is not limited thereto.

According to exemplary embodiments, in splitting the code base by the splitting module 416, the CIEM 406 may cause the defining module 424 to define each dependency as any other components which a specific component uses or imports. For example, as illustrated in the code base 502 in FIG. 5, dependencies for component 1 may include component 2, component 5, etc., dependencies for component 2 may include component 1, component 4, etc., dependencies for component 3 may include component 2, component 4, etc., and so on, but the disclosure is not limited thereto. It is possible for component 1 to depend on component 2 and for component 2 to depend on component 1 at the same time. These values are simply utilized for illustration purposes without departing from the scope of the present disclosure.

According to exemplary embodiments, the defining module 424 may be configured to define each dependency in a manner such that when components are files, then a first component depends on a second component when the file of the first component uses or imports the file of the second component, but the disclosure is not limited thereto.

According to exemplary embodiments, the defining module 424 may be configured to define each dependency in a manner such that the first component depends on the second component, and at the same time, the second component depends on the first component, but the disclosure is not limited thereto.

According to exemplary embodiments, in converting the code base 502 into a code graph 504 by the graph converter tools 508, the CIEM 406 may cause the identifying module 426 to identify different components of the code base 502 and find all component dependencies in the code base 502. The generating module 428 may then be configured to generate the code graph 504 in a manner such that each component is a node in the graph and each dependency is a directed or ordered edge in the code graph (see, e.g., the code graph 504 as illustrated in FIG. 5. For example, it can be said that the code graph 504 has an edge from component 1 to component 2 if component 1 depends on component 2. This order can be visually depicted by the GUI 432 using arrows as seen in FIG. 5.

According to exemplary embodiments, the node metrics related to the code graph properties may include one or more of the following: number of incoming edges, number of outgoing edges, number of reachable nodes that can be reached following outgoing edges, number of nodes one can start from and follow outgoing edges to reach a current node, but the disclosure is not limited thereto.

According to exemplary embodiments, the centrality measures may include one or more of the following: degree centrality which relates to the number of edges it has (the higher the degree, the more central the node is; this can be an effective measure, since many nodes with high degrees also have high centrality by other measures); closeness centrality which relates to the number of edges one need to take to reach other nodes in the code graph, betweenness centrality which relates to how many paths use a given node in order to detect an amount of influence a node has over a flow of information in the code graph, and PageRank centrality which relates to a measure of influence of a node focusing on edges in a path rather than the nodes, but the disclosure is not limited thereto.

According to exemplary embodiments, closeness centrality is a way of detecting nodes that are able to spread information very efficiently through the code graph 504. The closeness centrality of a node measures its average farness (inverse distance) to all other nodes. Nodes with a high closeness score have the shortest distances to all other nodes.

According to exemplary embodiments, betweenness centrality is a way of detecting the amount of influence a node has over the flow of information in the code graph 504. This betweenness centrality may be utilized by the CIEM 406 to find nodes that serve as a bridge from one part of a graph to another. The algorithm calculates shortest paths between all pairs of nodes in the code graph 504.

According to exemplary embodiments, the implementing module 422 may be configured to implement an artificial intelligence/machine learning model to cluster similar components to determine different types of components to be marked as important; and generate the importance score (see, e.g., component importance 506 as illustrated in FIG. 5 by utilizing the artificial intelligence/machine learning model. According to exemplary embodiments, the code graph 504 may be represented as the artificial intelligence/machine learning model.

According to exemplary embodiments, the CIEM 406 may be configured to develop more robust artificial intelligence for metric composition. More data would allow larger neural networks to be applied for this task. According to exemplary embodiments, the artificial intelligence model may be utilized as a "black box" as many models may be used here for calculating component importance 506, i.e., code importance and can be utilized in identifying important bugs before system failure, analyzing code riskiness, and recommending interference to reduce impact of the bugs and potential code duplication, but the disclosure is not limited thereto.

Figure 6:
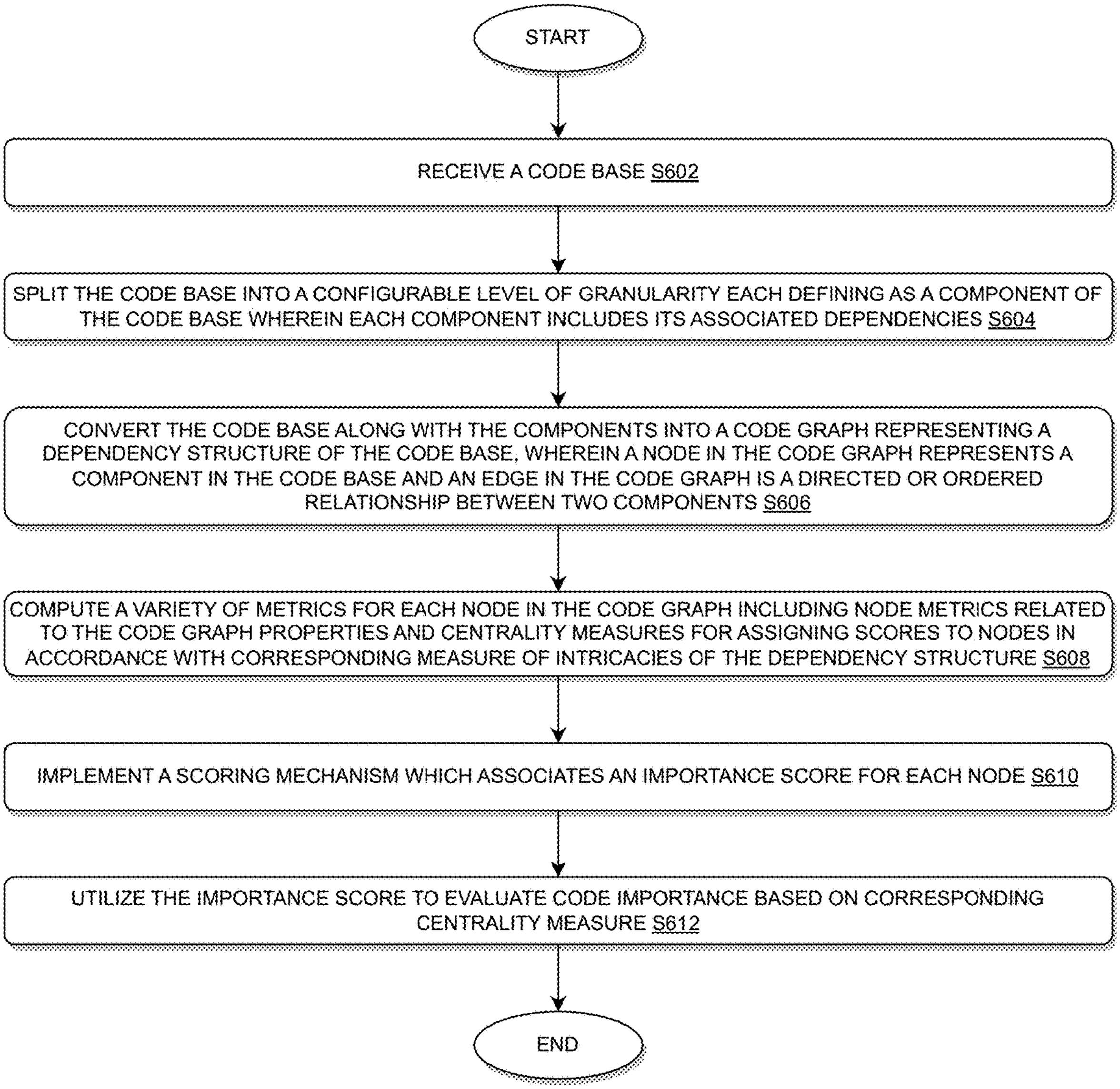
FIG. 6 illustrates an exemplary flow chart of a process implemented by the platform, language, database, and cloud agnostic code importance evaluating module of FIG. 4 for systemically and dynamically evaluating code importance via graph centralities in accordance with an exemplary embodiment.

FIG. 6 illustrates an exemplary flow chart of a process 600 implemented by the platform, language, database, and cloud agnostic CIEM 406 of FIG. 4 for systemically and dynamically modelling large code bases as directed graphs and using graph metrics and graph centrality measures to identify important pieces of code in accordance with an exemplary embodiment. It may be appreciated that the illustrated process 600 and associated steps may be performed in a different order, with illustrated steps omitted, with additional steps added, or with a combination of reordered, combined, omitted, or additional steps.

As illustrated in FIG. 6, at step S602, the process 600 may include receiving a code base.

At step S604, the process 600 may include splitting the code base into a configurable level of granularity each defining as a component of the code base wherein each component includes its associated dependencies.

At step S606, the process 600 may include converting the code base along with the components into a code graph representing a dependency structure of the code base. A node in the code graph represents a component in the code base and an edge in the code graph is a directed or ordered relationship between two components.

At step S608, the process 600 may include computing a variety of metrics for each node in the code graph including node metrics related to the code graph properties and centrality measures for assigning scores to nodes in accordance with corresponding measure of intricacies of the dependency structure.

At step S610, the process 600 may include implementing a scoring mechanism which associates an importance score for each node.

At step S612, the process 600 may include utilizing the importance score to evaluate code importance based on corresponding centrality measure.

According to exemplary embodiments, in splitting the code base, the process 600 may further include: defining each dependency as any other components which a specific component uses or imports.

According to exemplary embodiments, the process 600 may further include: defining each dependency in a manner such that when components are files, then a first component depends on a second component when the file of the first component uses or imports the file of the second component.

According to exemplary embodiments, the process 600 may further include: defining each dependency in a manner such that the first component depends on the second component, and at the same time, the second component depends on the first component.

According to exemplary embodiments, in converting the code base into a code graph, the process 600 may further include: identifying different components of the code base; finding all component dependencies in the code base; and generating the code graph in a manner such that each component is a node in the graph and each dependency is a directed or ordered edge in the code graph.

According to exemplary embodiments, in the process 600, the node metrics related to the code graph properties may include one or more of the following: number of incoming edges, number of outgoing edges, number of reachable nodes that can be reached following outgoing edges, number of nodes one can start from and follow outgoing edges to reach a current node, but the disclosure is not limited thereto.

According to exemplary embodiments, in the process 600, the centrality measures may include one or more of the following: degree centrality which relates to the number of edges it has, closeness centrality which relates to the number of edges one need to take to reach other nodes in the code graph, betweenness centrality which relates to how many paths use a given node in order to detect an amount of influence a node has over a flow of information in the code graph, and PageRank centrality which relates to a measure of influence of a node focusing on edges in a path rather than the nodes, but the disclosure is not limited thereto.

According to exemplary embodiments, the process 600 may further include: implementing an artificial intelligence/machine learning model to cluster similar components to determine different types of components to be marked as important; and generating the importance score by utilizing the artificial intelligence/machine learning model.

According to exemplary embodiments, the CIED 402 may include a memory (e.g., a memory 106 as illustrated in FIG. 1) which may be a non-transitory computer readable medium that may be configured to store instructions for implementing a platform, language, database, and cloud agnostic CIEM 406 for systemically and dynamically modelling large code bases as directed graphs and using graph metrics and graph centrality measures to identify important pieces of code as disclosed herein. The CIED 402 may also include a medium reader (e.g., a medium reader 112 as illustrated in FIG. 1) which may be configured to read any one or more sets of instructions, e.g., software, from any of the memories described herein. The instructions, when executed by a processor embedded within the CIEM 406 or within the CIED 402, may be used to perform one or more of the methods and processes as described herein. In a particular embodiment, the instructions may reside completely, or at least partially, within the memory 106, the medium reader 112, and/or the processor 104 (see FIG. 1) during execution by the CIED 402.

According to exemplary embodiments, the instructions, when executed, may cause a processor embedded within the CIEM 406 or the CIED 402 to perform the following: receiving a code base; splitting the code base into a configurable level of granularity each defining as a component of the code base wherein each component includes its associated dependencies; converting the code base along with the components into a code graph representing a dependency structure of the code base, wherein a node in the code graph represents a component in the code base and an edge in the code graph is a directed or ordered relationship between two components; computing a variety of metrics for each node in the code graph including node metrics related to the code graph properties and centrality measures for assigning scores to nodes in accordance with corresponding measure of intricacies of the dependency structure; implementing a scoring mechanism which associates an importance score for each node; and utilizing the importance score to evaluate code importance based on corresponding centrality measure. According to exemplary embodiments, the processor may be the same or similar to the processor 104 as illustrated in FIG. 1 or the processor embedded within the CIED 202, CIED 302, CIED 402, and CIEM 406 which is the same or similar to the processor 104.

According to exemplary embodiments, in splitting the code base, the instructions, when executed, may cause the processor 104 to further perform the following: defining each dependency as any other components which a specific component uses or imports.

According to exemplary embodiments, the instructions, when executed, may cause the processor 104 to further perform the following: defining each dependency in a manner such that when components are files, then a first component depends on a second component when the file of the first component uses or imports the file of the second component.

According to exemplary embodiments, the instructions, when executed, may cause the processor 104 to further perform the following: defining each dependency in a manner such that the first component depends on the second component, and at the same time, the second component depends on the first component.

According to exemplary embodiments, in converting the code base into a code graph, the instructions, when executed, may cause the processor 104 to further perform the following: identifying different components of the code base; finding all component dependencies in the code base; and generating the code graph in a manner such that each component is a node in the graph and each dependency is a directed or ordered edge in the code graph.

According to exemplary embodiments, the instructions, when executed, may cause the processor 104 to further perform the following: implementing an artificial intelligence/machine learning model to cluster similar components to determine different types of components to be marked as important; and generating the importance score by utilizing the artificial intelligence/machine learning model.

According to exemplary embodiments as disclosed above in FIGS. 1-6, technical improvements effected by the instant disclosure may include a platform for implementing a platform, language, database, and cloud agnostic code importance evaluating module configured to systemically and dynamically model large code bases as directed graphs and using graph metrics and graph centrality measures to identify important pieces of code, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer-implemented method executed by one or more processors for evaluating code importance via graph centralities, the method comprising:
- receiving, by a receiving module, a code base;
- splitting, by a splitting module, the code base into a configurable level of granularity each defining as a component of the code base wherein each component includes its associated dependencies;
- defining, by a defining module, each dependency as any other components which a specific component uses or imports;
- converting, by a converting module, the code base along with the components into a code graph representing a dependency structure of the code base, wherein each component is a node in the code graph, each dependency is a directed or ordered edge in the code graph, and the code graph preserves cyclic dependencies in which a first component depends on a second component and the second component depends on the first component;
- computing, by a computing module, node metrics related to code graph properties including: number of incoming edges, number of outgoing edges, number of reachable nodes that can be reached following outgoing edges, and number of nodes one can start from and follow outgoing edges to reach a current node;
- calculating shortest paths between all pairs of nodes in the code graph to determine betweenness centrality;
- implementing, by an implementing module, graph metrics and artificial intelligence/machine learning tools to calculate component importance and generate an importance score for each node; and
- utilizing the importance score to place additional checks on changes to a component including extra tests or pull request reviews to prevent system-breaking bugs.

2. The method according to claim 1, further comprising:
- computing centrality measures for assigning scores to nodes in accordance with corresponding measure of intricacies of the dependency structure, wherein the centrality measures include one or more of the following: degree centrality which relates to number of edges it has, closeness centrality which relates to number of edges one need to take to reach other nodes in the code graph, betweenness centrality which relates to how many paths use a given node in order to detect an amount of influence a node has over a flow of information in the code graph, and PageRank centrality which relates to a measure of influence of a node focusing on edges in a path rather than the nodes.

3. The method according to claim 1, further comprising:
- implementing a machine learning model to cluster similar components to determine different types of components to be marked as important; and
- generating the importance score by utilizing the machine learning model.

4. A system for evaluating code importance via graph centralities, the system comprising:
- a processor; and
- a memory operatively connected to the processor via a communication interface, the memory storing computer readable instructions, when executed, causes the processor to:
- receive, by a receiving module, a code base;
- split, by a splitting module, the code base into a configurable level of granularity each defining as a component of the code base wherein each component includes its associated dependencies;
- define, by a defining module, each dependency as any other components which a specific component uses or imports;
- convert, by a converting module, the code base along with the components into a code graph representing a dependency structure of the code base, wherein each component is a node in the code graph, each dependency is a directed or ordered edge in the code graph, and the code graph preserves cyclic dependencies in which a first component depends on a second component and the second component depends on the first component;
- compute, by a computing module, node metrics related to code graph properties including: number of incoming edges, number of outgoing edges, number of reachable nodes that can be reached following outgoing edges, and number of nodes one can start from and follow outgoing edges to reach a current node;
- calculate shortest paths between all pairs of nodes in the code graph to determine betweenness centrality;
- implement, by an implementing module, graph metrics and artificial intelligence/machine learning tools to calculate component importance and generate an importance score for each node; and
- utilize the importance score to place additional checks on changes to a component including extra tests or pull request reviews to prevent system-breaking bugs.

5. The system according to claim 4, wherein the processor is further configured to compute centrality measures for assigning scores to nodes in accordance with corresponding measure of intricacies of the dependency structure, wherein the centrality measures include one or more of the following: degree centrality which relates to number of edges it has, closeness centrality which relates to number of edges one need to take to reach other nodes in the code graph, betweenness centrality which relates to how many paths use a given node in order to detect an amount of influence a node has over a flow of information in the code graph, and PageRank centrality which relates to a measure of influence of a node focusing on edges in a path rather than the nodes.

6. The system according to claim 4, wherein the processor is further configured to:
- Implement a machine learning model to cluster similar components to determine different types of components to be marked as important; and
- generate the importance score by utilizing the machine learning model.

7. A non-transitory computer readable medium configured to store instructions for evaluating code importance via graph centralities, the instructions, when executed, cause a processor to perform the following:

receiving, by a receiving module, a code base;

splitting, by a splitting module, the code base into a configurable level of granularity each defining as a component of the code base wherein each component includes its associated dependencies;

defining, by a defining module, each dependency as any other components which a specific component uses or imports;

converting, by a converting module, the code base along with the components into a code graph representing a dependency structure of the code base, wherein each component is a node in the code graph, each dependency is a directed or ordered edge in the code graph, and the code graph preserves cyclic dependencies in which a first component depends on a second component and the second component depends on the first component;

computing, by a computing module, node metrics related to code graph properties including: number of incoming edges, number of outgoing edges, number of reachable nodes that can be reached following outgoing edges, and number of nodes one can start from and follow outgoing edges to reach a current node;

calculating shortest paths between all pairs of nodes in the code graph (504) to determine betweenness centrality;

implementing, by an implementing module, graph metrics and artificial intelligence/machine learning tools to calculate component importance and generate an importance score for each node; and utilizing the importance score to place additional checks on changes to a component including extra tests or pull request reviews to prevent system-breaking bugs.

8. The non-transitory computer readable medium according to claim 7, wherein the instructions, when executed, further cause the processor to perform the following:

computing centrality measures for assigning scores to nodes in accordance with corresponding measure of intricacies of the dependency structure wherein the centrality measures include one or more of the following: degree centrality which relates to number of edges it has, closeness centrality which relates to number of edges one need to take to reach other nodes in the code graph, betweenness centrality which relates to how many paths use a given node in order to detect an amount of influence a node has over a flow of information in the code graph, and PageRank centrality which relates to a measure of influence of a node focusing on edges in a path rather than the nodes.

9. The non-transitory computer readable medium according to claim 7, wherein the instructions, when executed, further cause the processor to perform the following:

implementing a machine learning model to cluster similar components to determine different types of components to be marked as important; and generating the importance score by utilizing the machine learning model.

* * * * *